(12) United States Patent
Cheng et al.

(10) Patent No.: US 6,456,650 B1
(45) Date of Patent: Sep. 24, 2002

(54) SPLITTERLESS MODEM USING HARMONICS REDUCTION

(75) Inventors: Yaqi Cheng, Rowlett, TX (US); Adam M. Chellali, Richardson, TX (US); Michael O. Polley, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/244,607

(22) Filed: Feb. 4, 1999

Related U.S. Application Data

(60) Provisional application No. 60/073,660, filed on Feb. 4, 1998.

(51) Int. Cl.[7] .................................................. H04B 1/38
(52) U.S. Cl. ...................... 375/222; 375/225; 375/260; 375/275; 370/210; 370/480; 370/483; 370/487; 379/93.01; 379/92.03; 379/92.04; 379/406.14; 379/406.13; 379/398; 379/394
(58) Field of Search ................................ 375/222, 225, 375/216, 275; 379/93.01, 92.03, 92.04, 398, 394, 406.14, 406.13, 416; 370/480, 483, 487, 210

(56) References Cited

U.S. PATENT DOCUMENTS

| | | | | |
|---|---|---|---|---|
| 5,901,205 A | * | 5/1999 | Smith et al. | 379/93.01 |
| 6,101,216 A | * | 8/2000 | Henderson et al. | 375/222 |
| 6,151,335 A | * | 11/2000 | Ko et al. | 370/487 |
| 6,212,227 B1 | * | 4/2001 | Ko et al. | 375/222 |

* cited by examiner

Primary Examiner—Jean Corrielus
Assistant Examiner—Khanhcong Tran
(74) Attorney, Agent, or Firm—Pedro P. Hernandez; W. James Brady, III; Frederick J. Telecky, Jr.

(57) ABSTRACT

In a splitterless Digital Subscriber Line (DSL) modem 30, a receiver architecture (100) that permits monitoring of harmonics within the upstream channel of a DSL connection. The receiver (100) can detect the harmonics by monitoring the harmonics in some empty tones or specified tones. A threshold can be set to differ the normal noise power and harmonics power in those empty or specified tones. When a POTS device (10) coupled to same wire line pair (20) as the DSL modem (30) goes off-hook, the DSL modem (30) can switch from the normal state to an off-hook state in which the harmonics are reduced to minimum by transmitting only the upper sub-band tones of the upstream transmission channel at reduced power levels.

17 Claims, 3 Drawing Sheets

SPLITTERLESS MODEM USING HARMONICS REDUCTION

This application claims the benefit of provisional application 60/073,660 filed Feb. 4, 1998.

RELATED APPLICATION

This application is related to U.S. patent application Ser. No. 09/216,082 by Ibrahim, Polley, and Payne entitled "Residential Power Cutback for Splitterless DSL Operation," filed Dec. 18, 1998, the entirety of which is incorporated herein by reference.

TECHNICAL FIELD

The invention relates generally to communications over the Public Switch Telephone Network (PSTN) including local subscriber loops and more particularly to a system and method of reducing interference in a splitterless DSL modem environment caused when telephone equipment coupled to a twisted pair wiring goes off-hook causing unwanted harmonics generated when the DSL signals encounter the off-hook circuitry in the telephone equipment.

BACKGROUND OF THE INVENTION

The increased use of telephone twisted pair wiring for data communications has resulted in a push for faster modems and improved signaling protocols compatible with the public switch telephone network (PSTN). An example includes the emerging modem communication standards which have pushed the limit of transmission speeds close to 56 Kbps. Another example includes the emerging variety of the DSL communications protocols including asymmetric digital subscriber line (ADSL), symmetric digital subscriber line (SDSL), high bit rate digital subscriber line (HDSL), and very high rate digital subscriber line (VDSL). Each DSL variant represents a different transmission speed over a different distance of copper pair wiring. Currently, industry is producing equipment capable of implementing one or more of the DSL protocols. Modems, routers, line cards, and digital loop carrier systems are all examples of such equipment.

In principle, a DSL modem and a plain old telephone system (POTS) or other voice band device can operate simultaneously over the same wire line pair since they use different frequency bands. The connection, however, of a POTS equipment to the same wire line pair as a DSL modem can suffer from several problems that result from the change in input impedance of the POTS equipment as it is added to the line. In essence, a POTS equipment is not designed to handle frequencies outside the voice band of 300–3.4 kHz. In addition, a POTS often contains nonlinear components that may create harmonic interferences. Examples of such nonlinear components include Zener diodes, transistors, varistors, triacs, and other devices used for overvoltage protection, sidetone generation and overvolume protection.

Splitterless modems try to take advantage of this principle to transmit both voice band and digital DSL signals simultaneously. An example of such a splitterless modem architecture is disclosed in related U.S. patent application Ser. No. 09/216,082 (the "Related Application"), entitled "Residential Power Cut-back for Splitterless DSL Operation".

In a splitterless configuration, when the POTS goes off-hook during a DSL transmission, these components can distort the DSL signal causing intermodulation and producing nonlinear echos of the upstream DSL signal. Harmonics of these echos lie in the downstream DSL band, and thus severely corrupt the downstream signal.

Therefore, when a splitter is not utilized to separate the ADSL modem and the Plain Old Telephone System (POTS), the DSL and the POTS equipment will generate interference overlapping their respective frequency bands. For example, assuming the DSL modem transmits upstream from approximately 30 kHz to 140 kHz, the nonlinear circuitry in the POTS equipment may affect the upstream signals once the POTS goes off-hook. The harmonics generated by the DSL signal encountering the POTS equipment contributes to the distortion and noise over the communications link resulting in loss of data and/or a reduction in the upstream data rate.

Since discrete multi-tone modulation is the preferred method of line coding in a standard DSL system, there are many subbands in both the upstream and downstream directions which can be effected by the harmonic interference caused when a POTS device goes off-hook. In a splitterless environment, the harmonics from the off-hook telephone set are likely to be distributed over all the tones in both directions. Thus, a method of detecting the off-hook state of the telephone set and placing the DSL transceiver in an alternative operating state could help reduce or deal with the effects of such harmonics.

SUMMARY OF THE INVENTION

The present invention provides a DSL communications device capable of detecting harmonics generated when a Plain Old Telephone System (POTS) device coupled to the same wire line pair as the DSL device goes off-hook. A threshold level of power in each tone can be established so that the DSL device is able to switch between states in which the modem parameters are optimized to work with the POTS equipment in either the on-hook or off-hook state. In the off-hook state, techniques are applied that reduce the unwanted harmonics in the upstream and downstream paths. By transmitting data on fewer tones of the upstream channel, an increase in the number of downstream channels is realized.

In one embodiment, only the upper sub-band tones in the upstream direction are utilized at lower power levels to reduce the effects of unwanted harmonics in the downstream tones and thereby reduce the effects of voiceband interference. While the upstream data rate may be reduced, the communications link is maintained and the downstream data rate continues as high as possible. In essence, the physical characteristics of the distortion generated by the nonlinear components in the POTS equipment is exploited to achieve high throughput.

Also disclosed is a method of reducing the effects of harmonics generated when a POTS device goes off-hook comprising the steps of monitoring the harmonics of DSL signals generated over said communications link and controlling the tones used to communicate said DSL signals over said communications link communications network with a, splitterless Digital Subscriber Line (DSL) modem and a Plain Old Telephone System (POTS) device communicating over the same communications link.

BRIEF DESCRIPTION OF THE DRAWINGS

Other aspects of the invention including specific embodiments are understood by reference to the following detailed description taken in conjunction with the appended drawings in which.

References in the detailed description correspond to like references in the figures unless otherwise indicated.

DETAILED DESCRIPTION OF PREFERRED EMBODIMENTS

The present invention provides a splitterless DSL modem that is able to detect unwanted harmonics generated by upstream transmissions that are distorted by nonlinear components in the POTS equipment thereby freeing up tones in the downstream channel. In this way, the effects of harmonics generated when a voice band device such as Plain Old Telephone System (POTS) goes off-hook are reduced. The upstream data rate may be reduced but the downstream data rate is maintained as high as possible due to the reduced nonlinear distortion observed in the receiver.

Figure 1A:
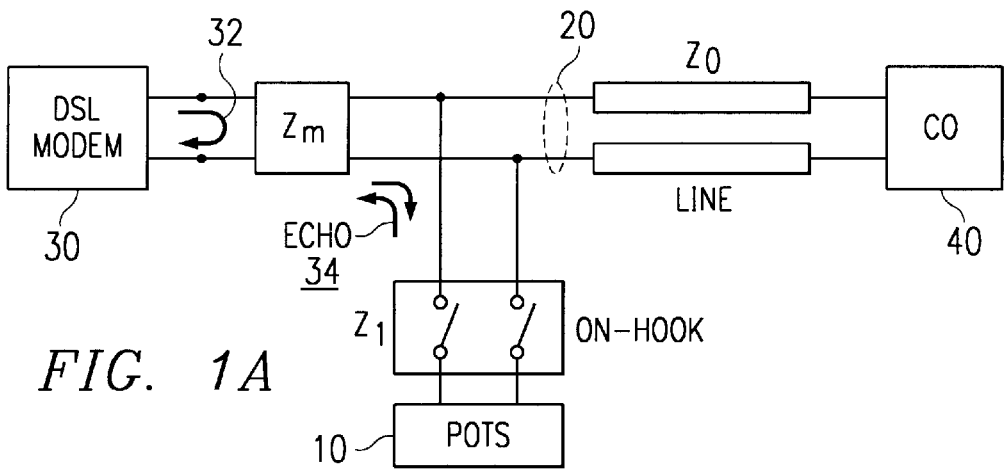
FIG. 1A and 1B illustrate the on-hook/off-hook state of the Plain Old Telephone System coupled to a wire line pair.
Figure 1B:
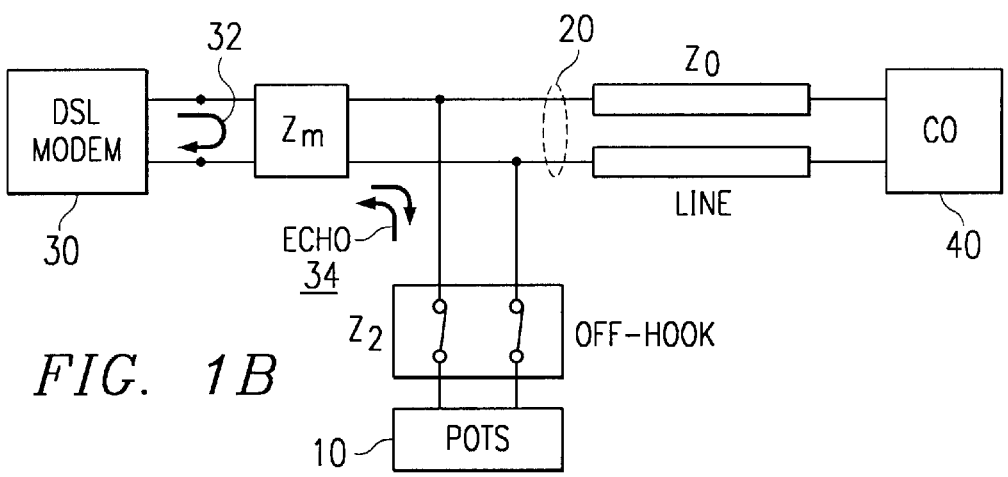

To better understand the invention, reference is made to FIGS. 1a and 1b which illustrate the effects of the POTS 10 on the wire line pair 20. Typically, the wire line pair 20 comprises of twisted copper pair connection of the type found in many public switch telephone network (PSTN) installations. As shown, the wire line pair 20 is used to connect subscriber side equipment such as the DSL modem 30 and POTS 10 to the central office 40 or other centralized call exchange facility dedicated for routing calls placed by a user of the DSL modem 30 or POTS 10. The DSL modem 30 is capable of implementing any one of the variant DSL protocols including asymmetric digital subscriber line (ADSL), high ADSL rate digital subscriber line (HDSL), and very high rate digital subscriber line (VDSL), among others. Each variant potentially represents a different transmission speed over a different distance of copper line.

In general, DSL technology allows concurrent use of traditional voice band communications equipment and DSL equipment on the wire line pair 20. The POTS 10 represents a wide array of traditional telephonic equipment such as an analog telephone, fax machine, or other similar voice band device operating within the voice band frequency range of 30–3.4 kHz. While only a single POTS 10 is shown in FIGS. 1a and 1b, the methods described herein are applicable for communications environments that include a multitude of different telephone equipment connected to the wire line pair 20. For example, both a POTS 10 and a standard analog modem can be attached to the wire line pair 20. It is contemplated that additional transmission line profiles associated with the different combinations of devices coupled to the wire line pair 20 can be maintained.

The POTS 10 creates an impedance Z1 across the wire line pair 20 corresponding to on-hook operation of the POTS 10 as shown in FIG. 1A. For on-hook operation of the POTS 10, the wire line pair 20 has not been seized and the impedance seen by the DSL modem 30 (Zm) is equal to impedance of the POTS in on-hook state (Z1) in parallel with the impedance of the wire line pair (Z0). The line impedance Z0 is a function of the transmission line characteristics of the wire line pair 20 and can be affected by the resistance and length of the wire line pair 20, balance of the wire line pair 20, capacitance and other well known transmission line characteristics.

Impedance mismatches between the various devices coupled to the wire line pair 20 can create echos (indicated as the arrows in FIGS. 1A and 1B). For example, the upstream impedance (Zm) presented to the DSL modem 30 can create an echo signal 32 which must be subtracted by the receiver (not shown in FIGS. 1A and 1B) of the DSL modem 30 for proper signal resolution. The modulation protocols and echo cancellation functions in the DSL modem 30 are responsible for separating the echo signal 32 from the carrier receive signals from the modem at the far end. Typically, with POTS 10 in the on-hook state, the upstream impedance (Zm) is roughly equal that of the line impedance (Z0) resulting in a total line impedance that is predictable given the line transmission characteristics of the wire line pair 20.

In FIG. 1B, the POTS 10 has gone off-hook meaning that it has seized the wire line pair 20 and added an off-hook impedance value (Z2) to the overall upstream impedance (Zm) presented to DSL modem 30. Since the POTS 10 is designed to operate within the voice band of approximately 30–3.4 kHz, the addition of the POTS 10 to the wire line pair 20 can create nonlinearities in the upstream impedance (Zm) presented to the DSL modem. Such nonlinearities are caused by the existence of nonlinear components within the POTS 10 such as Zener-diodes, transistors, varistors, triacs and other similar devices, which may be used for over-voltage protection, side tone generation and/or overvolume protection. The resulting harmonics generated by the DSL signal hitting the voice band circuitry can produce intermodulation distortion which appears as nonlinear echos in the entire DSL band as well as the voice band. These nonlinear echos are represented by arrows 32 and 34.

Figure 2:
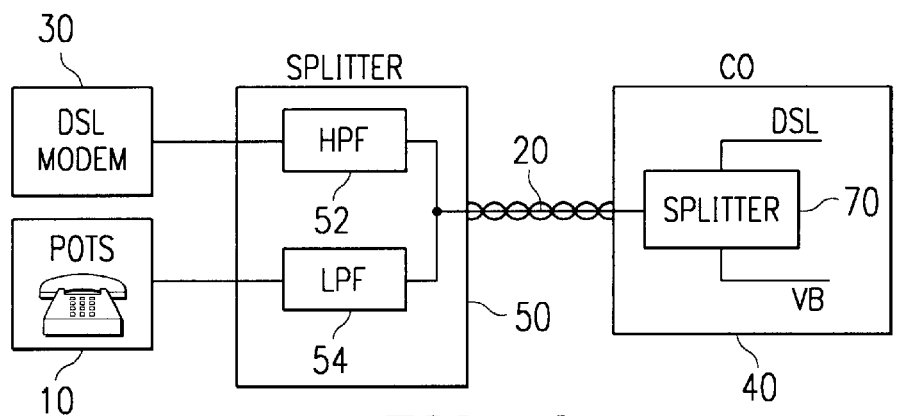
FIG. 2 illustrates the operation of a DSL modem and a voice band device coupled to the same wire line pair with appropriate filtering in the corresponding bands.

Thus, the upstream impedance (Zm) presented to the DSL modem 30 is a function of either (Z1) or (Z2) depending on the on-hook and off-hook state of the POTS 10. An attempt to overcome the effects of such nonlinearities is the use of a splitter 50 as shown in FIG. 2. The splitter 50 contains a high pass filter 52 and a low pass filter 54 which are used to isolate to the high frequency DSL signal content generated by the DSL modem 30 from the low frequency signals within the voice band generated by the POTS 10. If so configured, a second splitter 70 can be utilized at the central office 40 to separate the combined DSL and voice band signal spectrums which arrive over the wire line pair 20. In this way, the DSL modem 30 and POTS 10 can utilize the same wire line pair 20 to transmit signals to the central office 40.

Various splitter configurations are available and can be used to perform the voice band—DSL band splitting function. For example, the splitter 50 can be part of the DSL modem 30 with the POTS 10 connected to the DSL modem 30 through a port, jack or other connection mechanism. Alternatively, the splitter 50 can be installed at a line drop to the user's home which may require professional installation and rewiring of the telephone lines going into the DSL modem 30. In either case, the use of a splitter 50 increases the complexity of the customer side equipment and/or the cost associated with utilizing the DSL modem 30.

Also, the central office 40 must install the appropriate call handling equipment that is able to split the DSL content from the voice band content of signals arriving over wire line 20. This may mean obtaining a line card with an integrated signal splitter or other similar communications device.

Since the signals generated by the POTS 10 and DSL modem 30 reside in completely different spectrums, it is theoretically possible to use the same twisted pair connection 20 without the splitter 50. In order to accomplish this however, the DSL modem 30 must be able to handle the effects of nonlinearities created by the POTS 10 as it goes from an on-hook state to an off-hook state in normal operation.

The invention involves the use of a DSL modem 30 and POTS 10 over the same wire line pair 20 without a splitter 50. Preferably, as discussed in the Related Application, the DSL modem 30 is able to maintain two operating conditions: one corresponding to the on-hook state of the POTS 10 and another corresponding to the off-hook state. For each of the two conditions a set of parameters or transmission line coefficients for the transceiver in the DSL modem 30 are used. During the off-hook state of POTS 10, only a small subset of the subbands, preferably the upper subbands, of the upstream channel are used and at a reduced power level thus making more tones in the downstream channel available due to the reduced distortion levels.

Figure 3:
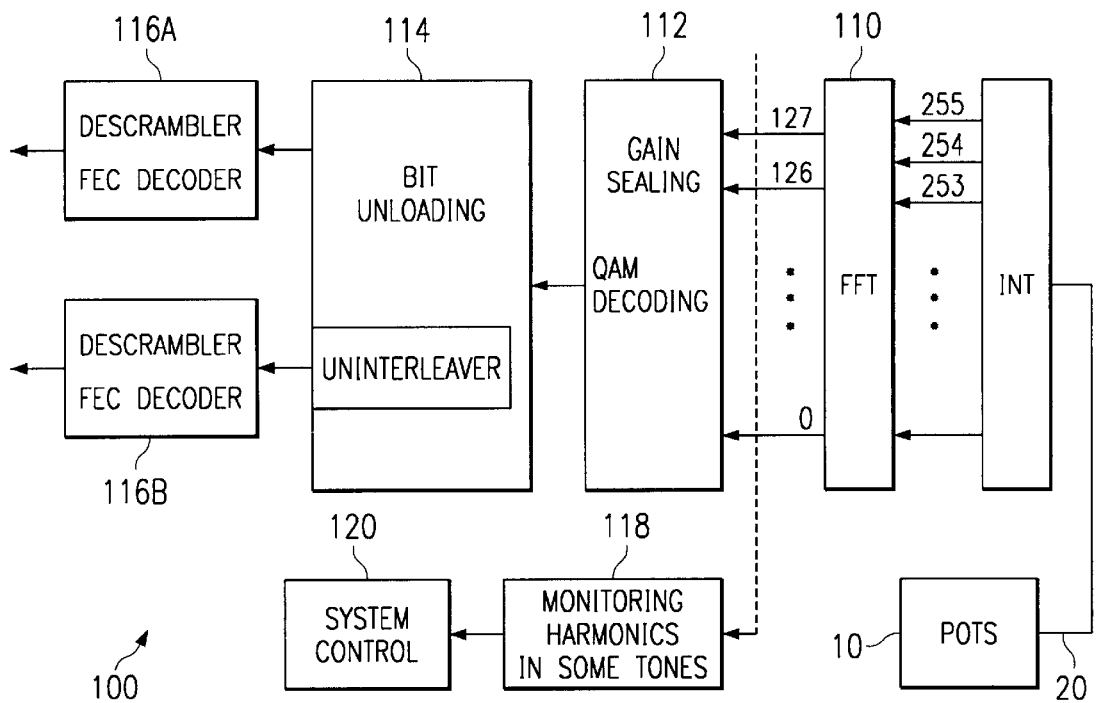
FIG. 3 is a block diagram of a DSL receiver illustrating how it can be utilized to measure the harmonics and specified tones when a voice band device goes off-hook.

Referring now to FIG. 3, a block diagram of a DSL receiver is shown and denoted generally as 100. In general, the DSL receiver 100 comprises four main blocks: the Fast Fourier Transform (FFT) block 110, the Quadrature Amplitude Modulation (QAM) decoding block 112, the bit unloading block 114, and the FEC decoder block 116A, 116B for interleaved and uninterleaved bits, respectively. To detect harmonics when the POTS 10 is off-hook, a monitoring function 118 is provided as well as an additional system control function 120 that provides feed back from the FFT block 110. The fact that the monitoring function 118 and the system control function 120 are provided allows the DSL receiver 100 to reduce the effects of unwanted harmonics generated when the POTS device 10 goes off-hook by reducing the number of tones used and also reducing the power.

Thus, the monitoring function 118 is capable of detecting what harmonics are generated when the POTS device 10 goes off-hook. This permits the receiver 100 to measure the harmonics in some specified tones of the upstream channel and make a decision as to which tones to utilize and how much reduction in power to apply within the used tones. According to one embodiment of the invention, the system control function 120 is configured to control the utilization of tones by effecting the output of the IFFT function in the transmitter to cause a reduction in unwanted harmonics.

Figure 4:
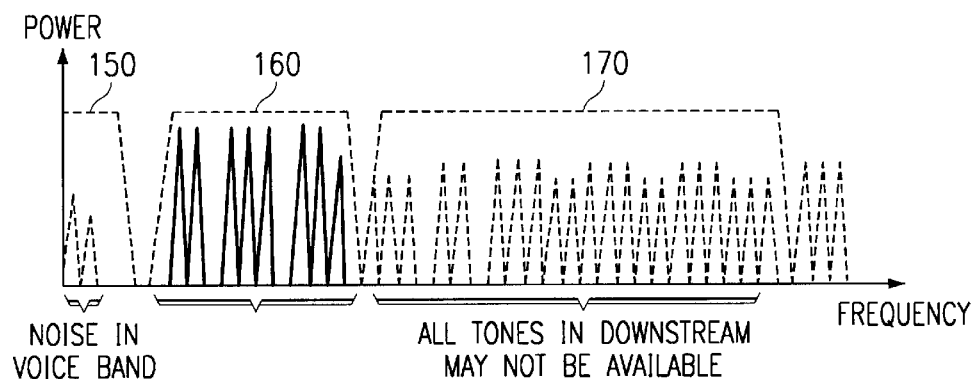
FIG. 4 illustrates the principles of harmonic reduction within the upstream bands that make tones in the downstream band be available according to the invention.
Figure 4:
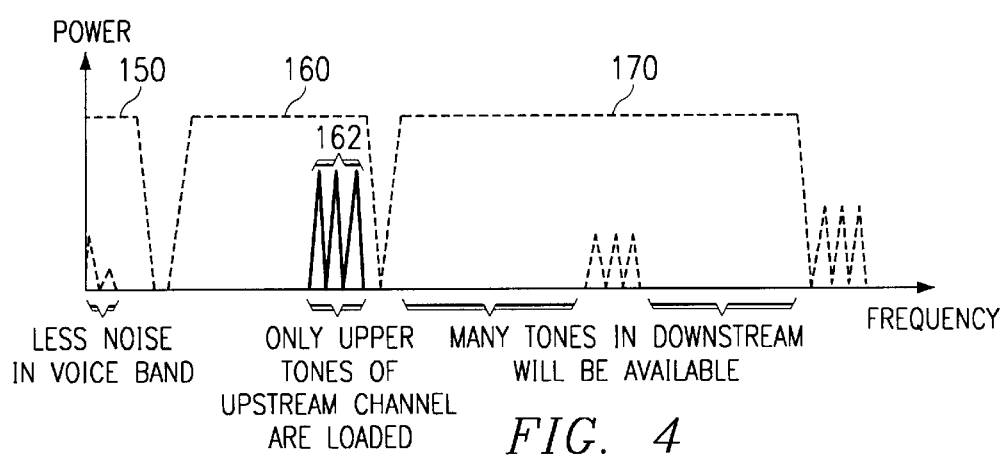

Referring to FIG. 4, therein is shown a comparison of sample frequency spreads for normal DSL operation when the POTS device 10 is on-hook (top graph) and the result once harmonic reduction has been applied (bottom graph) with the POTS device 10 going off-hook. FIG. 4 shows the voice band 150, upstream channel band and downstream channel band 170, respectively. In particular, when most of the tones in the upstream band 160 are loaded, harmonics of the upstream band 160 might cover all the subbands of the downstream band 170 as well as the voice band 150 because of non-linear components in the POTS device 10. Thus, all the tones in the downstream band 170 may not be utilized since the unwanted harmonics may be unacceptably noisy as long as the POTS device 10 is off-hook.

In contrast, the lower graph of FIG. 4 illustrates the effects of limiting the number of tones in the upstream band 160 that are used while the POTS device 10 is off-hook. In this case, only tones in the upper subbands 162 of the upstream channel 160 are loaded. Also, the power levels of the upstream tones 162 are reduced. The end result is that the downstream band 170 has more available tones and, as such, the data rate in the downstream direction is maintained as high as possible. Of course, the use of less tones in the upstream band 150 means a decrease in the upstream data rate. Generally, this sacrifice is acceptable for most communications applications.

Thus, since the upper subband tones 162 in the upstream channel 160 contribute much less harmonics to the tones in the downstream band 170, the overall data rate of the DSL communications system according to the invention is improved. This is accomplished by recognizing that the harmonics of the upper subband tones 162 are beyond the downstream frequency band 170. In addition, by reducing the power upstream tones 162, less energy is concentrated in the harmonics with a narrower frequency spread in the tones utilized in the downstream band 170.

Figure 5:
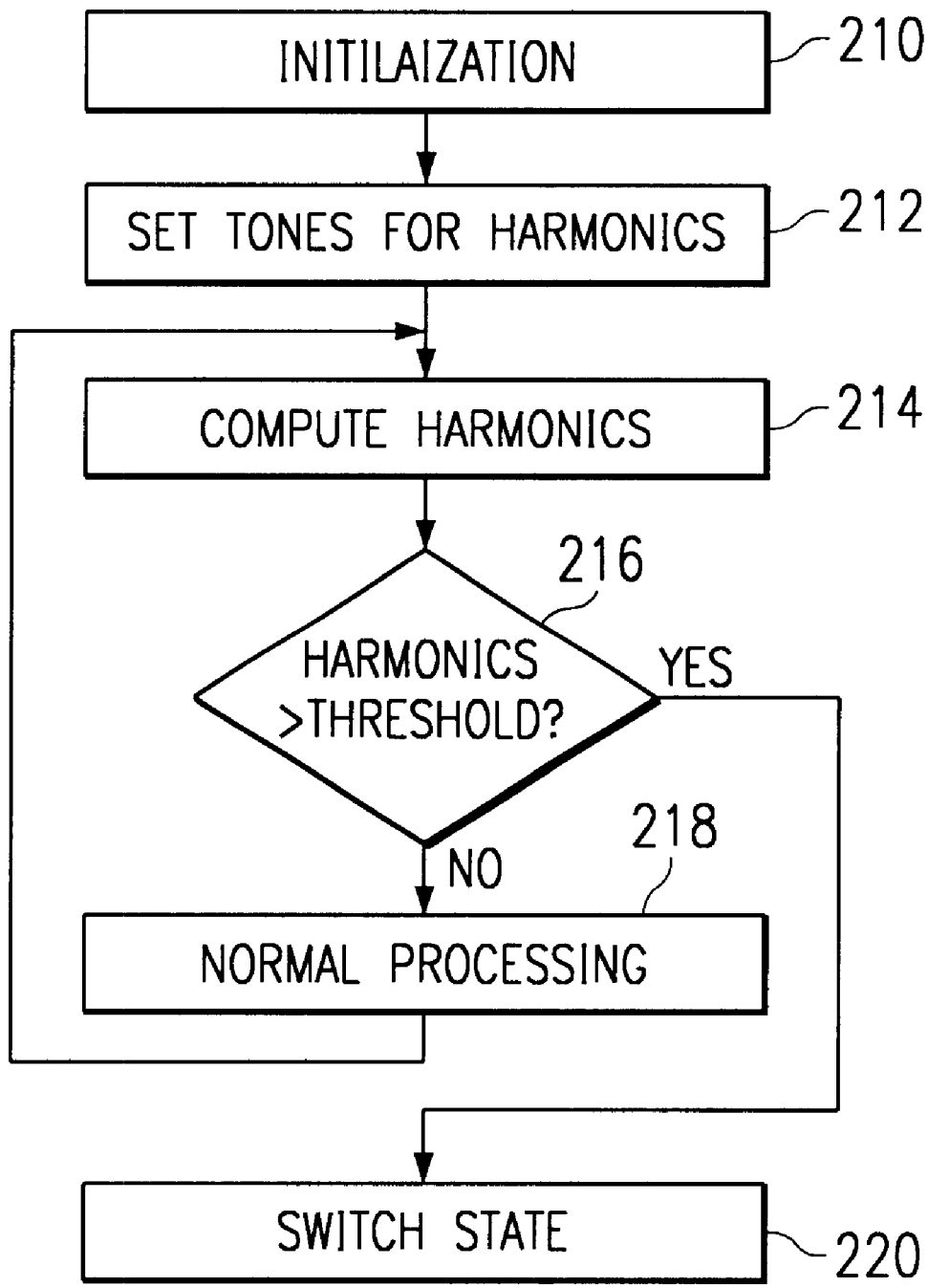
FIG. 5 is a process diagram of the harmonics monitoring function according to the invention.

FIG. 5 shows a process flow diagram of a harmonics monitoring method 200 according to one embodiment of the invention. The DSL modem 30 first initializes the tones, step 210, in the upstream band 160 to locate any empty tones or to specify some tones for harmonic monitoring, step 212. Those tones with bits loaded can not be used for harmonic monitoring.

Next, at step 214 the DSL modem 30 monitors and computes the harmonics which exist with in the upstream band 160. A pre-set threshold for detected harmonics is established. While the POTS device 10 is on-hook, the FFT function 110 outputs the vectors of all tones. The monitoring function 118 can compute the sum of harmonics power over all the monitored tones after FFT. By comparing the sum to the threshold at step 216, the DSL modem 30 through its system control function 120 can make decisions whether to continue the normal framing process, step 218, or to switch to another state that reduces harmonics when the POTS device 10 set is off-hook, step 220. In case of a switch to the off-hook state, the transmitter of the DSL modem 30 can transmit using send tones within the upper subbands 162 of the upstream channel 160. Transmission occur at lower power levels in the upstream band 160, so that the downstream band 170 and the voice band 150 could be much less affected by unwanted harmonics.

While the invention has been described in conjunction with preferred embodiments, it should be understood that modifications will become apparent to those of ordinary skill in the art and that such modifications are therein to be included within the scope of the invention and the following claims.

What is claimed is:

1. In a communications network with a splitterless Digital Subscriber Line (DSL) modem and a Plain Old Telephone System (POTS) device communicating over the same communications link, a method of reducing the effects of harmonics generated when the POTS device seizes the communications link comprising the steps of:

monitoring the harmonics of DSL signals generated over said communications link; and controlling the tones used to communicate said DSL signals over said communications by reducing the number of tones used in the upstream channel over said communications link.

2. The method according to claim 1 wherein said step of monitoring the harmonics of DSL signals is preceded by the step of detecting when said POTS device goes off-hook.

3. The method according to claim 2 wherein the step of reducing the number of tones is performed by reducing tone in the lower part of the upstream channel.

4. In a communications network with a splitterless Digital Subscriber Line (DSL) modem and a Plain Old Telephone System (POTS) device communicating over the same communications link, a method of reducing the effects of harmonics generated when the POTS device seizes the communications link comprising the steps of:

monitoring the harmonics of DSL signals generated over said communications link;

controlling the tones used to communicate said DSL signals over said communications link; and reducing the power level of tones used to transmit said DSL signals over said communications link.

5. In a communications network with a splitterless Digital Subscriber Line (DSL) modem and a Plain Old Telephone System (POTS) device communicating over the same communications link, a method of reducing the effects of harmonics generated when the POTS device seizes the communications link comprising the steps of:

monitoring the harmonics of DSL signals generated over said communications link;

controlling the tones used to communicate said DSL signals over said communications link;

limiting the tones used to transmit DSL signals in the upstream channel; and lowering the amplitude of the tones used to transmit DSL signals.

6. In a communications network with a splitterless Digital Subscriber Line (DSL) modem and a Plain Old Telephone System (POTS) device communicating over the same communications link, a method of reducing the effects of harmonics generated when the POTS device seizes the communications link comprising the steps of:

monitoring the harmonics of DSL signals generated over said communications link;

controlling the tones used to communicate said DSL signals over said communications link; and setting the tones for said harmonics.

7. A receiver for a splitterless DSL modem comprising:

an interface to a communications link coupling said modem to a central office facility;

an FFT function with an input side coupled to said interface and an output side;

a modulation decoder coupled to said output side of said FFT function; and a harmonic monitor configured to determine the harmonic content of signals appearing at said output side of said FFT function, said means coupled to said FFT function adjacent said modulation decoder.

8. The receiver according to claim 7 further comprising a system control coupled to said harmonic monitor.

9. The receiver according to claim 8 wherein said system control is configured to reduce the number of tones utilized by said splitterless DSL modem to communicate signals over said communications link.

10. The receiver according to claim 8 wherein said system control is configured to reduce the power level of tones utilized by said splifterless DSL modem to communicate signals over said communications link.

11. A splitterless digital subscriber line (DSL) modem capable of detecting harmonics generated when a Plain Old Telephone System (POTS) device coupled to the same transmission line as the DSL modem goes off-hook, the DSL modem comprising:

an interface to the transmission line;

an harmonic monitor coupled to said interface for receiving signals appearing over said transmission line, wherein said harmonic monitor is able to detect harmonics generated when the POTS goes off-hook; and a system control function coupled to said harmonic monitor and configured to determine the power level and location of tones used by said splitterless DSL modem to communicate.

12. The DSL modem of claim 11 wherein said system control function can reduce power levels in the upper subbands of the upstream channel used by said splitterless DSL modem to communicate.

13. The DSL modem of claim 11 further comprising a means of controlling the tones used by said DSL modem to communicate upstream over said transmission line.

14. The DSL modem of claim 13 wherein said means of controlling the tones is integrated into the receiver of said DSL modem.

15. The DSL modem of claim 11 wherein said system control function can reduce the number of tones of the upstream channel used by said splifterless DSL modem to communicate.

16. The DSL modem of claim 15 wherein said system control function limits tones to the upper subbands of said upstream channel.

17. In a communications network including a Digital Subscriber Line (DSL) modem and a Plain Old Telephone System (POTS) device communicating over the same communications link, a method comprising the steps of:

monitoring the harmonics generated over said communications link when said POTS device seizes the communication link; and limiting the number of tones used in the upstream channel of the communication link by the DSL modem in response to said monitoring.

* * * * *